(12) United States Patent
Wu et al.

(10) Patent No.: US 11,944,039 B2
(45) Date of Patent: Apr. 2, 2024

(54) RIDING MOWER

(71) Applicant: Nanjing Chervon Industry Co., Ltd., Nanjing (CN)

(72) Inventors: Rong Wu, Nanjing (CN); Toshinari Yamaoka, Nanjing (CN); Dingming Meng, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 720 days.

(21) Appl. No.: 17/114,834

(22) Filed: Dec. 8, 2020

(65) Prior Publication Data

US 2021/0084821 A1 Mar. 25, 2021

Related U.S. Application Data

(63) Continuation of application No. PCT/CN2019/090721, filed on Jun. 11, 2019.

(51) Int. Cl.
| | |
|---|---|
| *A01D 69/10* | (2006.01) |
| *A01D 34/64* | (2006.01) |
| *A01D 34/82* | (2006.01) |
| *B60T 7/04* | (2006.01) |
| *B60T 7/06* | (2006.01) |

(Continued)

(52) U.S. Cl.
CPC ............ *A01D 69/10* (2013.01); *A01D 34/824* (2013.01); *B60T 7/045* (2013.01); *B60T 7/06* (2013.01); *F16H 21/44* (2013.01); *A01D 34/64* (2013.01); *A01D 2101/00* (2013.01)

(58) Field of Classification Search
CPC .............................. A01D 34/824; A01D 34/64
See application file for complete search history.

(56) References Cited

U.S. PATENT DOCUMENTS

| 9,915,324 B2 * | 3/2018 | Shoji ............... B60W 30/18181 |
| 2007/0078582 A1 * | 4/2007 | Musat ..................... B60T 7/104 |
| | | 701/70 |

(Continued)

FOREIGN PATENT DOCUMENTS

| CN | 202819008 U | * | 3/2013 |
| CN | 202819008 U | | 3/2013 |

(Continued)

OTHER PUBLICATIONS

ISA/CN, Int. Search Report issued on PCT application No. PCT/CN2019/090721, dated Aug. 22, 2019, 2 pages.

*Primary Examiner* — Abigail A Risic

(74) *Attorney, Agent, or Firm* — Greenberg Traurig, LLP

(57) ABSTRACT

A riding mower includes a seat, a main rack configured to bear the seat, a mowing element, a walking assembly for enabling the riding mower to walk across a lawn, and an operation assembly configured to be operated by the user so that the riding mower is controlled to walk and output power. The riding mower further includes a parking system, a linkage mechanism and a gearbox. The parking system is configured to switch the riding mower between a parking state and a non-parking state. The linkage mechanism is connected to the parking system. The gearbox is connected to the linkage mechanism. The parking system controls, through the linkage mechanism, the gearbox to implement braking.

10 Claims, 6 Drawing Sheets

(51) Int. Cl.
*F16H 21/44* (2006.01)
*A01D 101/00* (2006.01)

(56) References Cited

U.S. PATENT DOCUMENTS

| | | | | |
|---|---|---|---|---|
| 2009/0044506 | A1* | 2/2009 | Nunez | A01D 34/64 56/11.3 |
| 2009/0260912 | A1* | 10/2009 | Isogai | E02F 9/2004 180/336 |
| 2017/0211664 | A1* | 7/2017 | Shoji | B60W 30/18181 |
| 2021/0309189 | A1* | 10/2021 | Funk | B60T 7/06 |
| 2022/0201931 | A1* | 6/2022 | Ding | A01D 34/82 |

FOREIGN PATENT DOCUMENTS

| | | | |
|---|---|---|---|
| CN | 103350725 A | | 10/2013 |
| CN | 104340190 A | | 2/2015 |
| CN | 115428653 A | * | 12/2022 |
| CN | 115428654 A | * | 12/2022 |
| JP | 2008000088 A | | 1/2008 |

* cited by examiner

RIDING MOWER

RELATED APPLICATION INFORMATION

This application claims priority to Chinese Patent Application No. 201810595487.0, filed Jun. 11, 2018, the disclosure of which is incorporated herein by reference in its entirety.

TECHNICAL FIELD

The disclosure relates to the field of a riding electric machine and, in particular, to a riding mower.

BACKGROUND

A riding mower is a garden tool broadly applied to fields such as lawn mowing and vegetation mowing. An existing riding mower is a drivable individual miniature engineering machine. Generally, the special function of the riding mower decides the special construction of the riding mower. Due to factors such as special use environments, performance index requirements, man-machine relation matching and safety performance requirements, the machine body of the existing riding mower has a relatively complex structure, and particularly the double-pedal brake and the parking structure of the riding mower occupy a large space of the main rack of the mower. Moreover, since the braking function and the parking function are separated through the double-pedal structure, the structure of each connection member, particularly the linkage structure and the transmission structure, is more complex. In terms of a riding mower, on the premise that the performance requirements, function requirements and safety requirements are met, how to simplify the structure of the riding mower, particularly how to combine the braking function and the parking function, is an urgent problem to be solved.

SUMMARY

The disclosure provides a riding mower in which the braking function is combinable with the parking function.

The disclosure adopts the solution below.

A riding mower includes a seat, a main rack, a mowing element, a walking assembly and an operation assembly. The seat is configured to be seated by a user. The main rack is configured to bear the seat. The mowing element is configured to mow vegetation. The walking assembly is configured to enable the riding mower to walk. The operation assembly is configured to be operated by the user so that the riding mower is controlled to walk and output power. The riding mower further includes a parking system, a linkage mechanism and a gearbox. The parking system is configured to switch the riding mower between a parking state and a non-parking state. The linkage mechanism is connected to the parking system. The gearbox is connected to the linkage mechanism. The parking system is configured to control, through the linkage mechanism, the gearbox to implement braking. The riding mower is in the parking state when the parking system is locked, and the riding mower is in the non-parking state when the parking system is not locked or unlocked.

DETAILED DESCRIPTION

Figure 1:
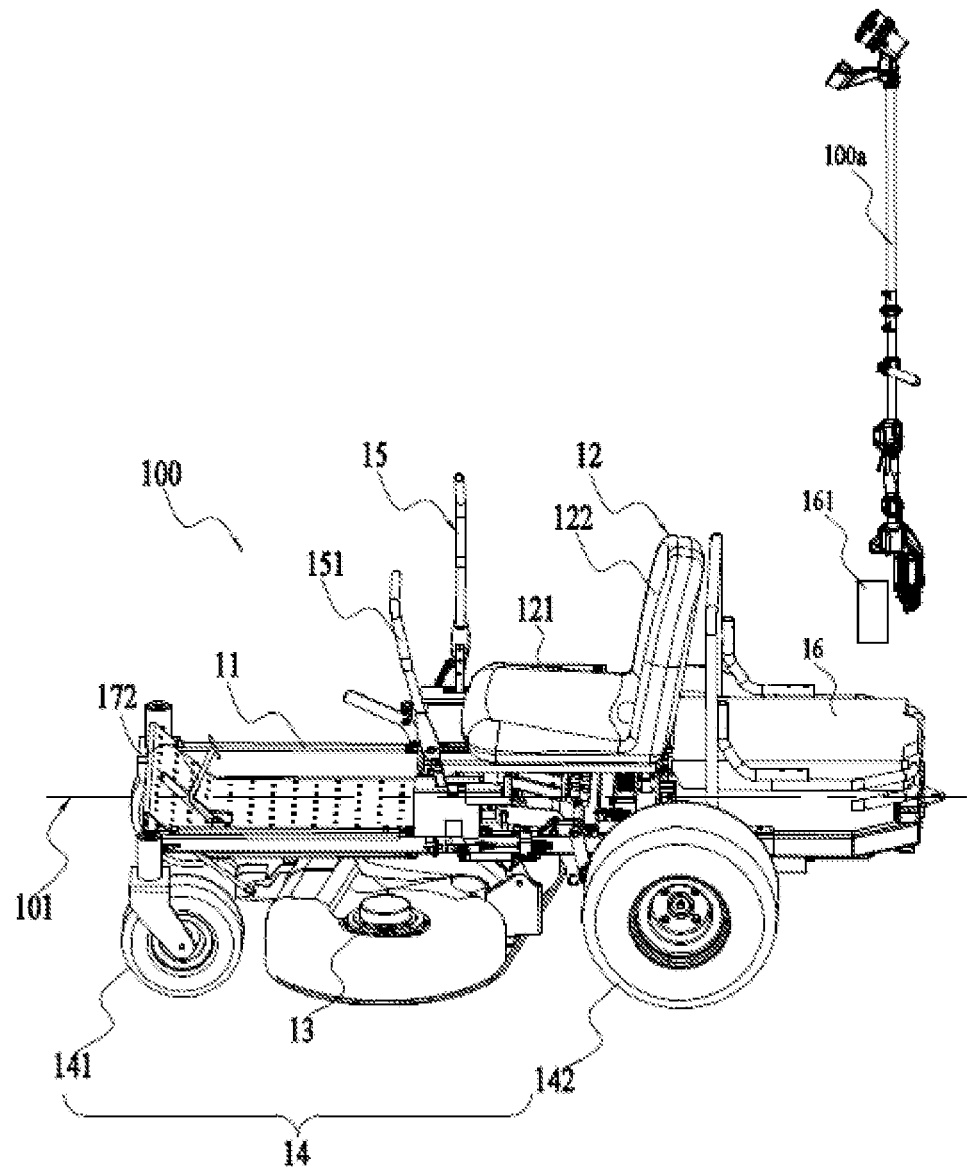
FIG. 1 is a perspective view of a riding mower and is a schematic view illustrating the structure of an electric tool system.

The riding electric machine as shown in FIG. 1 may be an electric machine for working indoors or outdoors. In this example, the electric machine may be, for example, a riding mower 100. The riding mower 100 can be ridden and operated by a user so that the riding mower 100 is controlled to mow a lawn, vegetation, or the like.

It can be understood that the riding electric machine may be other types of tools. The riding electric machine may be a riding electric vehicle such as an all-terrain vehicle or a golf cart. The riding electric machine may also be a riding electric tool functioning by outputting power in a certain form such as a riding snowplow or a riding agricultural machine. Apparently, the riding electric vehicle may also be a tool for other uses such as a riding mopper or a riding forklift.

For ease of describing the solution of the disclosure, as shown in FIG. 1, a front side, a rear side, an upper side and a lower side are defined.

As shown in FIG. 1, the riding mower 100 includes a main rack 11, a seat 12, a power output assembly 13, a walking assembly 14, an operation assembly 15 and a power unit 16.

The main rack 11 is configured to bear the seat 12, the power output assembly 13, the walking assembly 14, the operation assembly 15 and the power unit 16. At least a part of the main rack 11 extends in the direction of a first straight line 101 parallel with the front-rear direction. The preceding components and units are reasonably distributed on various parts of the main rack.

The seat 12 is configured to be seated by the user. The seat 12 is mounted on the main rack 11. The seat 12 is slidable relative to the main rack 11 in the direction of the first straight line 101 so that the seat 12 can move forwards or rearwards. The seat 12 includes a bottom 121 and a back 122. The bottom 121 substantially extends in the front-rear direction. The back 122 extends upwards from the bottom 121.

The power output assembly 13 includes an output member configured to output power to implement mechanical functions. For example, in this example, the output member may be a mowing element. The power output assembly 13 is connected to the main rack 11. In this example, the power output assembly 13 may be mounted on the lower side of the main rack 11. In some examples, the power output assembly 13 further includes a motor and a chassis. The mowing element is configured to implement the function of mowing. The motor is configured to drive the mowing element to rotate rapidly. The chassis is formed with an accommodation space configured to accommodate at least a part of the motor and a part of the mowing element. The power output assembly may include more than one mowing element. The number of first motors may correspond to the number of mowing elements.

The walking assembly 14 is configured to enable the riding mower 100 to walk on, i.e., move across/over, a lawn. In some examples, the walking assembly 14 may include first road wheels 141 and second road wheels 142. In the front-rear direction, the first road wheels 141 are disposed on the front side of the second road wheels 142. In this example, the number of the first road wheels 141 is 2, and the number of the second road wheels 142 is also 2. At least a part of the power output assembly 20 is disposed between the first road wheels 141 and the second road wheels 142 in the direction of the first straight line 101, and at least a part of the seat 12 is disposed between the first road wheels 141 and the second road wheels 142 in the direction of the first straight line 101, so that the center of gravity G1 of the whole machine is located between the first road wheels 141 and the second road wheels 142 in the direction of the first straight line 101, thereby improving the balance performance of the whole machine. In some examples, each first road wheel 141 may be a universal wheel rotatable about the first axis 102. Each first road wheel 141 has a first diameter. In some examples, the walking assembly 14 may further include second motors configured to drive the second road wheels 142 to rotate about a second axis. The number of the second motors may also be 2 so that when the two second motors drive, at different rotation speeds, the respective two second road wheels 142 to rotate, the speed difference generated between the two second road wheels 142 causes the direction of the riding mower 100 to change. Each second road wheel 142 has a second diameter. The second diameter of each second road wheel 142 is greater than the first diameter of each first road wheel 141.

In some examples, the operation assembly 15 is configured to be operated by the user so that the riding mower 100 is controlled to walk and output power. The operation assembly 15 may include a first operation element 151 and a second operation element. The first operation element 151 is configured to be operated manually by the user to start the motor so that the mowing element is controlled to mow the lawn, and the riding mower 100 is controlled to walk on the lawn. The second operation element is configured to be pedaled by the user, i.e., operated by foot, to control the working state of the mower.

The power unit 16 is configured to supply power to the motor. In some examples, the power unit 16 includes a plurality of first battery packs 161. Each first battery pack 161 can be demounted from the main rack 11 by the user. As shown in FIG. 1, the electric tool system includes the riding mower 100 of the disclosure and a hand-held electric tool 100*a*. The first battery packs 161 of the power unit 16 configured to supply power to the riding mower 100 can be demounted and then mounted in the hand-held electric tool 100*a* so that the first battery packs 161 can also supply energy to the hand-held electric tool 100*a*. That is, the first battery packs 161 of the power unit 16 of the disclosure is applied to not only the riding mower 100 but also the hand-held electric tool 100*a* so that the adaptability of the first battery packs 161 is improved, and the adaptability of the riding mower 100 to the first battery packs 161 is also improved. In some examples, the hand-held electric tool 100*a* may be a garden tool such as a lawn-mower, a branch-pruner or a blower. The hand-held electric tool 100*a* may also be a torsion-outputting tool such as an electric drill or an electric hammer. The hand-held electric tool 100*a* may also be a saw such as an electric circular saw, a turning saw or a reciprocating saw. The hand-held electric tool 100*a* may also be a grinding tool such as an angle grinder or a sander. Apparently, in other examples, the first battery packs 161 may be configured to supply power to a hand-propelled electric tool such as a hand-propelled mower or a hand-propelled snowplow.

Figure 2:
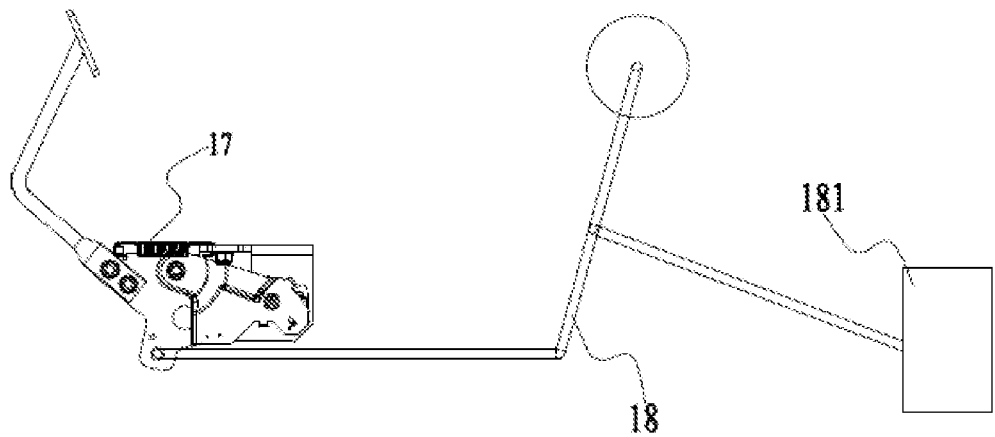
FIG. 2 is a schematic view of a braking structure of the riding mower of FIG. 1.

As shown in FIG. 2, in this example, the second operation element is connected to the parking system 17, the parking system 17 is connected to a linkage mechanism 18, and the linkage mechanism 18 is connected to a gearbox 181 so that braking is implemented. Therefore, the riding mower 100 can switch between a parking state and a non-parking state when in a braking state. In fact, the gearbox 181 further includes a brake lining for braking. It can be understood that when the riding mower 100 is working, and the movement speed of the riding mower 100 needs to be adapted due to conditions such as a road condition and a working condition, for example, when the riding mower 100 needs to decelerate by braking while climbing down a slope rapidly, or when the riding mower 100 needs to stay for a short time while climbing up a slope, the user can decelerate the riding mower 100 by braking and eventually stay at a preset position. In this case, the braking system needs to keep restricting the riding mower 100 from moving, and the braking system is in the parking state. In some examples, the state during the braking process of the riding mower 100 can be divided into two states, namely the parking state and the non-parking state. The riding mower 100 can be switched through the parking system 17 between the two preceding states.

The following is a specific description of the parking system 17.

Figure 3:
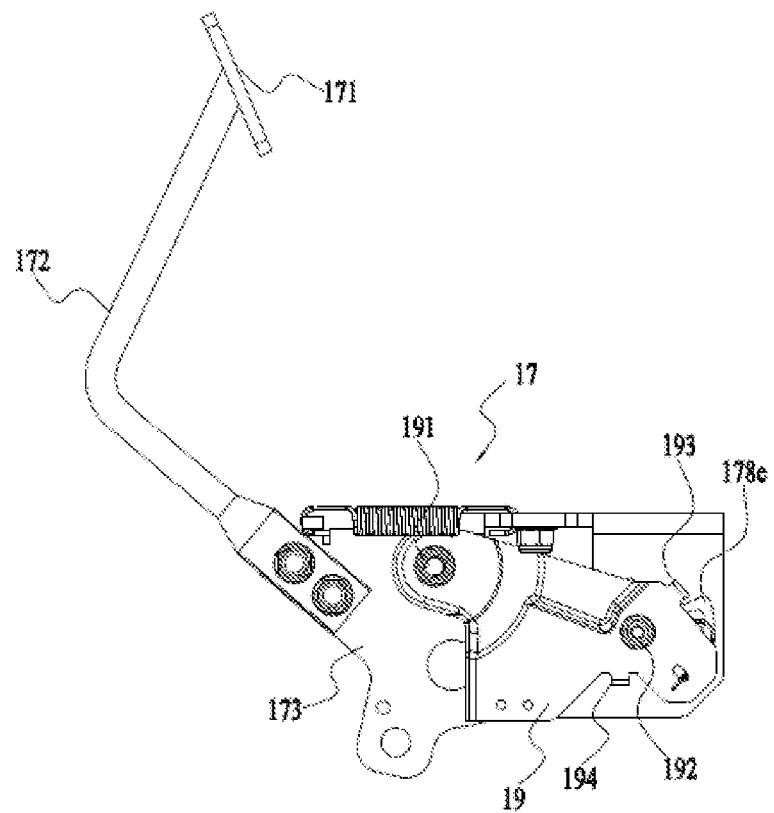
FIG. 3 is a plan view of a parking system of the riding mower of FIG. 1.
Figure 4:
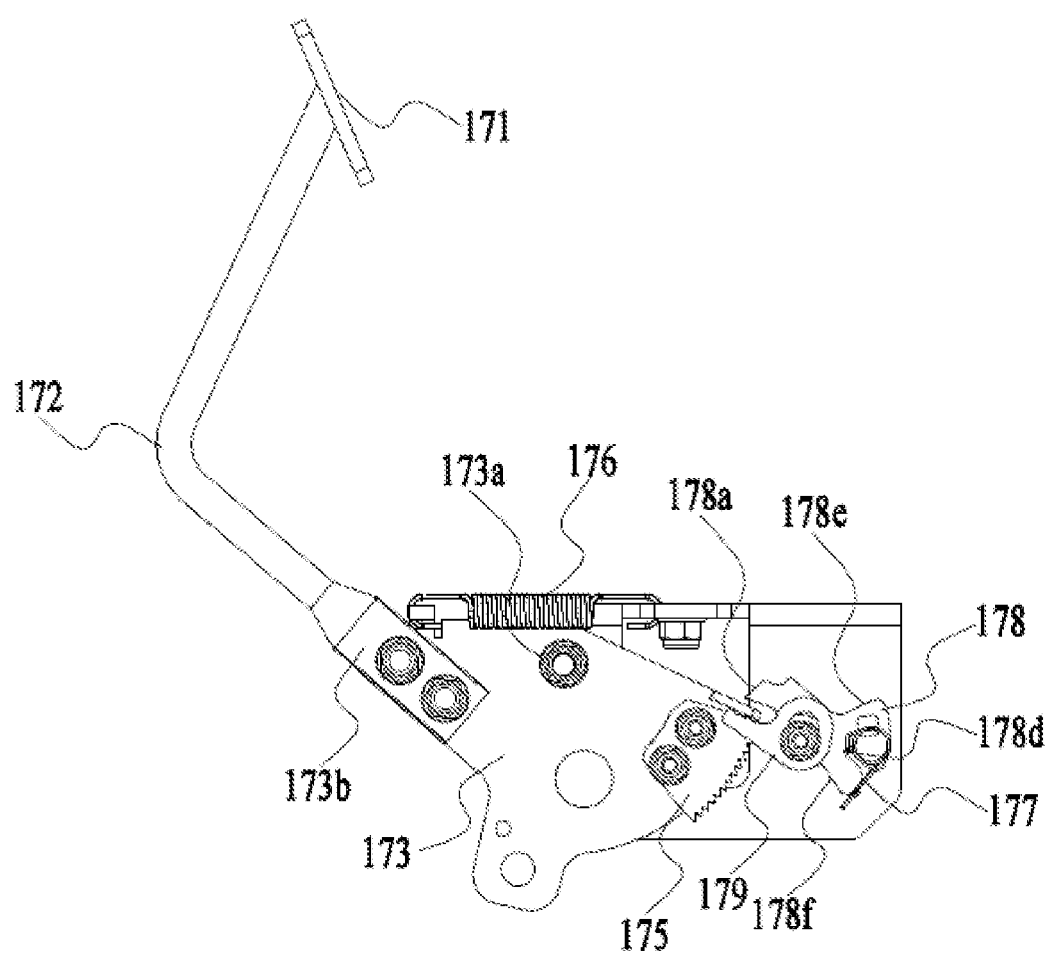
FIG. 4 is a plan view of the parking system of the riding mower of FIG. 3 without a cover plate.
Figure 5:
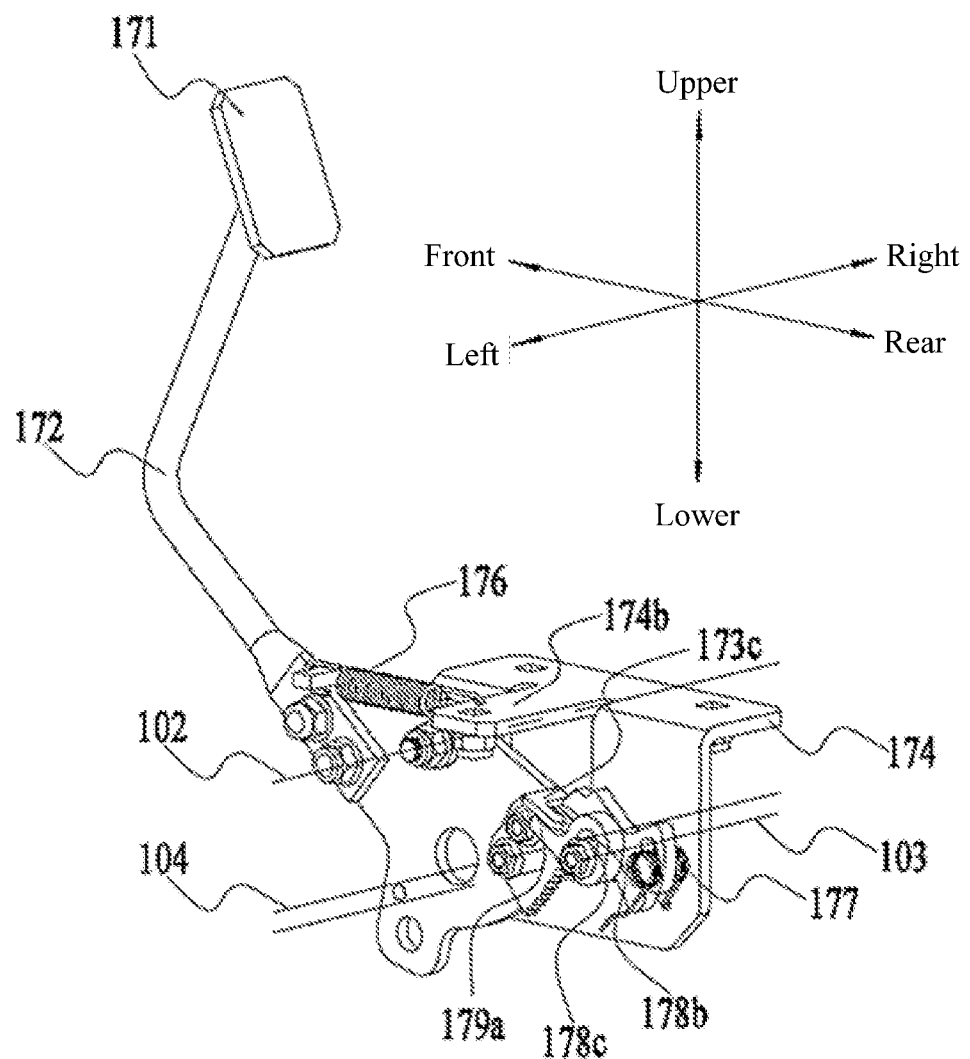
FIG. 5 is a perspective view of the parking system of the riding mower of FIG. 4.
Figure 6:
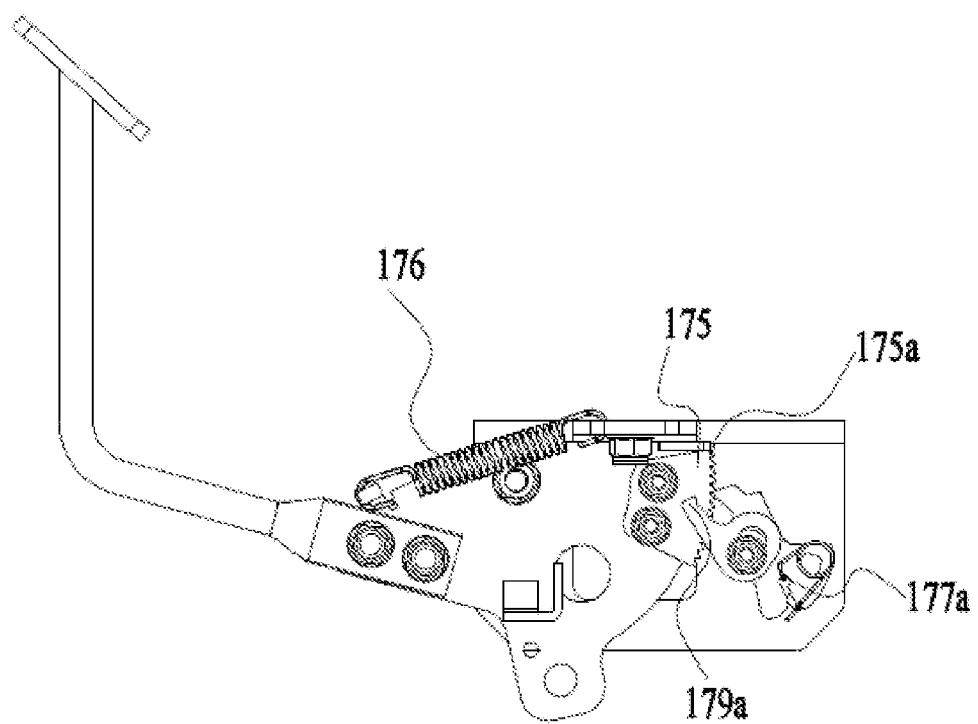
FIG. 6 is a plan view of the parking system of the riding mower of FIG. 4 when the riding mower is in the parking state.

As shown in FIGS. 3 to 5, in this example, the parking system 17 includes a pedal 171, a pedal arm 172, a first rotator 173, a base plate 174, a ratchet 175, a first elastic member 176, a second elastic member 177, a second rotator 178 and a third rotator 179. The pedal 171, the pedal arm 172 and the first rotator 173 forms a pedal assembly. In this example, the pedal assembly is the second operation element. The pedal arm 172 has two motion sections. When the pedal 171 is pedaled such that the pedal arm 172 is located in a first section, the riding mower 100 is in the non-parking state, and the parking system 17 controls, through the linkage mechanism 18, the gearbox 181 to brake. When the pedal 171 is pedaled such that the pedal arm 172 is located in the second section, the riding mower 100 is in the parking state, the parking system 17 controls, through the linkage mechanism 18, the gearbox 181 to brake, and the riding mower 100 is locked in the braking state.

For ease of describing the solution of the disclosure, the directions indicated by the arrows of FIG. 5 are defined as a left side, a right side, an upper side, a lower side, a front side and a rear side are defined. The pedal 171 is securely connected to one end of the pedal arm 172, and the other end of the pedal arm 172 is securely connected to the first rotator 173. The user pedals the pedal 171 to drive the first rotator 173 to rotate about the first center axis 102. It can be understood that the pedal 171, the pedal arm 172 and the first rotator 173 may be integrally formed to be the pedal assembly. Alternatively, the pedal 171, the pedal arm 172 and the first rotator 173 may be securely connected by welding, riveting, bolting, or the like to form the pedal assembly so long as the user can drive the pedal assembly to rotate about the first center axis 102 by pedaling the pedal 171. The detail is not repeated here. In some examples, to meet the assembly requirements, the upper side of the first rotator 173 is formed with a first connection hole 173a. The first connection hole 173a is rotatably connected to the base plate 174 and is rotatable about the first center axis 102. The first rotator 173 is rotatably connected to the base plate 174 through the first connection hole 173a. The front side of the first rotator 173 is formed with an extension portion 173b connected to the pedal arm 172. The rear side of the first rotator 173 is formed with a first protrusion 173c protruding from an extension surface of the first rotator 173. The rear side of the first rotator 173 is formed with second connection holes close to the first protrusion 173c. The second connection holes are used for connecting the ratchet 175. The ratchet 175 is securely connected to the first rotator 173 through the second connection holes. The ratchet 175 and the first rotator 173 can rotate about the first center axis 102 synchronously. The first rotator 173 is formed with a first mounting hole for mounting the first elastic member 176. The base plate 174 is formed with a second mounting hole for mounting the first elastic member 176. The first mounting hole, the second mounting hole and the first connection hole 173a are not colinear so that the first rotator 173 can rotate around the first connection hole 173a under the elastic force of the first elastic member 176.

In some examples, such as this example, the first mounting hole is disposed on the extension portion 173b of the first rotator 173 and located on the left side of the first connection hole 173a. The second mounting hole is disposed on the base plate 174 and located on the right side of the first connection hole 173a. In front-rear direction of the base plate 174, the upper side of the base plate 174 is formed with a second protrusion 174b. The second mounting hole is disposed on the second protrusion 174b. The first elastic member 176 is mounted in the first mounting hole and the second mounting hole and is pre-tensioned. When the user pedals the pedal 171 and the pedal assembly rotates about the first center axis 102, the pedal assembly needs to overcome the elastic force of the first elastic member 176. When the pedal arm 172 is in the first section, the riding mower 100 is in the non-parking state. When the user disengages from the pedal 171, the pedal assembly can reset automatically under the influence of the first elastic member 176.

As shown in FIGS. 5 and 6 to 8, in this example, the second rotator 178 is formed with a pawl 178a. The pawl 178a cooperates with the ratchet 175 connected to the first rotator 173, and the pawl 178a and the ratchet 175 form a ratchet-pawl structure. When the user pedals the pedal 171, the pedal assembly can rotate about the first center axis in a first direction. The ratchet 175 engages with the pawl 178a. When the user releases the pedal 171, the pedal assembly can reset in a second direction under the influence of the first elastic member 176. However, due to the limit from the pawl 178a, the pedal assembly cannot rotate backwards, and the position of the pedal assembly is limited. In this example, the first direction is the counterclockwise direction, and the second direction is the clockwise direction. Apparently, the preceding first direction and the preceding second direction can be construed reversely by those skilled in the art.

In some examples, the second rotator 178 is formed with a third connection hole 178b for connecting to the base plate 174. A connection pin 178c passes through the third connection hole 178b so that the second rotator 178 is rotatably connected to the base plate 174. The third connection hole 178b is in the shape of an ellipse. The third connection hole 178b is formed with a second center axis 103 and a third center axis 104. In the up-down direction, the second center axis 103 is on the lower side, the third center axis 104 is on the upper side, and the second center axis 103 is located on the lower side of the third center axis 104. The second rotator 178 can rotate about the connection pin 178c within the third connection hole 178b and can move between the position of the third connection hole 178b and the position of the third center axis 104 within the third connection hole 178b. As shown in FIGS. 3 and 4, when the pedal assembly is located in an original position, the second center axis 103 of the second rotator 178 is located on the connection pin 178c. In some examples, the second rotator 178 is further formed with an accommodation recess 178d for transmitting the elastic force of the second elastic member 177. The accommodation recess 178d is formed with a circular hole for enabling the second elastic member 177 to move and a passage for mounting the second elastic member 177. In some examples, the second elastic member 177 is a twin torsional spring structure. A snap ring 177a of the second elastic member 177 is mounted in the accommodation recess 178d, and the two tips of the second elastic member 177 are connected to the base plate 174 and a cover plate 19 configured to cover at least a part of the parking system 17 respectively. The cover plate 19 is formed with a fourth connection hole corresponding to the first connection hole 173a. The cover plate 19 is formed with a fifth connection hole corresponding to the third connection hole 178b. The cover plate 19 is securely connected to the base plate 174 through bolts. The second rotator 178 and the third rotator 179 are located between the cover plate 19 and the base plate 174 and are rotatable. As shown in FIG. 3, in this example, the cover plate 19 is further formed with a first stopper 193 and a second stopper 194. The second rotator 178 is formed with a third stopper 178e that is located on the upper side and the rear side of the first stopper 193 and is located on the rear side of the third connection hole 178b. When the second elastic member 177 is mounted on the parking system 17, the first stopper 193 abuts against the third stopper 178e, and the second elastic member 177 is pre-tensioned so that the snap ring 177a of the second elastic member 177 exerts a thrust towards the upper side on the second rotator 178. The second center axis 103 of the second rotator 178 is on the connection pin 178c due to the thrust when in an original state. The second rotator 178 is formed with a fourth stopper 178f on the lower side of the second rotator 178. The second stopper 194 stops the fourth stopper 178f so that the second rotator 178 is restricted from rotating in the second direction.

In some examples, the third rotator 179 is securely connected to or integrally formed with the second rotator 178. The third rotator 179 is further formed with a fifth stopper 179a. When the fifth stopper 179a contacts the first protrusion 173c of the first rotator 173, the fifth stopper 179a and the first protrusion 173c of the first rotator 173 transfer force to each other.

When the user operates the riding mower 100 to brake, the user pedals the pedal 171 so that the pedal assembly rotates about the first center axis 102 in the first direction to drive a brake swing arm 181 to move. The brake swing arm 181 drives a linkage to control the gearbox 181 to implement braking. When the ratchet 175 on the pedal assembly rotates to contact the pawl 178a, but before the ratchet 175 engages with the pawl 178a, the pedal arm 172 rotates within the first section. When the user disengages from the pedal 171, the pedal assembly can reset automatically under the influence of the first elastic member 176, and the riding mower 100 is in the non-parking state. It is to be noted that the first elastic member 176 of the first rotator 173 and the ratchet 175 form a leverage structure. That is, when the user pedals the pedal 171 so that the pedal assembly rotates about the first center axis 102 in the first direction, the pedal 171 pedaled by the user overcomes the elastic force of the first elastic member 176 to rotate, the first elastic member 176 is accumulating power, and the ratchet 175 tends to move upwards under the action of pedaling. When the user disengages from the pedal 171, the ratchet 175 moves downwards under the influence of the elastic force of the first elastic member 176.

When the user needs to continue braking and to keep the riding mower 100 staying in a designated position to park, the user needs to continue pedaling the pedal 171 to drive the pedal arm 172 to rotate to the second section. At this time, the pedal assembly rotates about the first center axis 102 in the first direction, and the pedal arm 172 rotates through the first section. The ratchet 175 contacts the pawl 178a by rotating and engages with the pawl 178a. At this time, the pawl 178a restricts the ratchet 175 from rotating, the elastic force of the first elastic member 176 cannot overcome the limitation of the pawl 178a, the pedal assembly is limited at an engaging position, the gearbox 181 keeps braking, and the riding mower 100 is in the parking state and stays in the designated position.

In some examples, when the second rotator 178 is mounted, the first stopper 193 abuts against the third stopper 178e, the second elastic member 177 is pre-tensioned, and the snap ring 177a of the second elastic member 177 exerts an upward thrust on the second rotator 178. Thus, when the parking system 17 is in a parking stage, the integrated body formed by the second rotator 178 and the third rotator 179 is affected by an upward thrust, the second center axis 103 coincides with the connection pin 178c, and the integrated body formed by the second rotator 178 and the third rotator 179 can rotate about the second center axis 103. According to the lever principle, since the snap ring 177a is located on the rear side of the third connection hole 178b, when the snap ring 177a exerts an upward thrust on the second rotator 178, the pawl 178a on the front side of the third connection hole 178b tends to move downwards. When the upper surface of a first tooth 175a of the ratchet 175 contacts the lower surface of the pawl 178a in the direction from the lower side to the upper side, the upper surface of the first tooth 175a of the ratchet 175 exerts a thrust on the lower surface of the pawl 178a. The thrust overcomes the elastic force of the second elastic member 177. When the upper surface of the first tooth 175a of the ratchet 175 rides over the lower surface of the pawl 178a, the pawl 178a engages with the ratchet 175 under the influence of the snap ring 177a due to the leverage. When the ratchet 175 continues rotating, the upper surface of a second tooth of the ratchet 175 exerts a thrust on the lower surface of the pawl 178a in the direction from the upper side to the lower side. The thrust overcomes the elastic force of the second elastic member 177. When the upper surface of the second tooth of the ratchet 175 rides over the lower surface of the pawl 178a, the pawl 178a and the ratchet 175 keep engaging due to the influence of the snap ring 177a.

Figure 7:
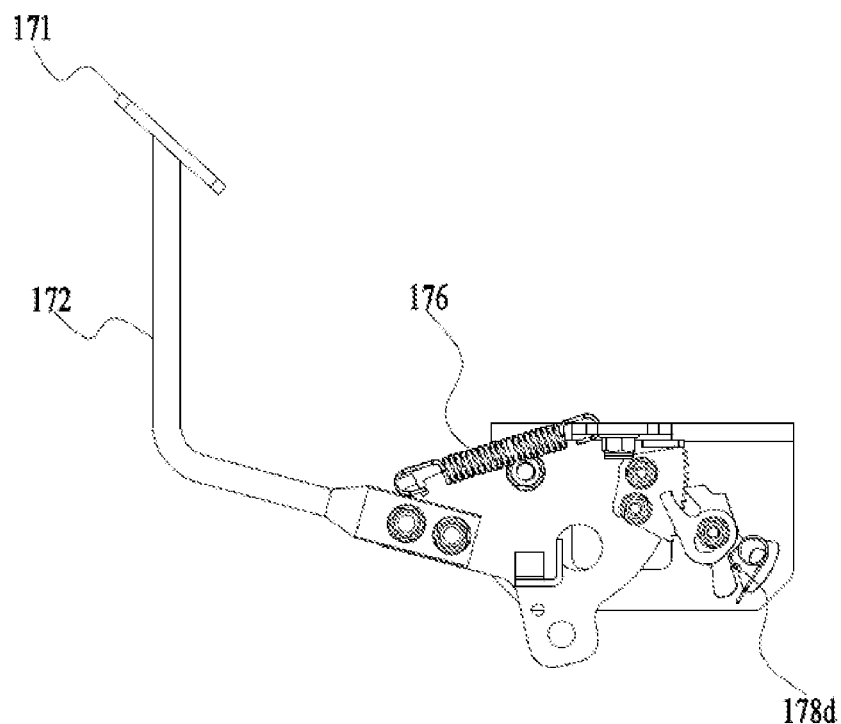
FIG. 7 is a plan view of the parking system of the riding mower of FIG. 6 when the riding mower is in the parking state.
Figure 8:
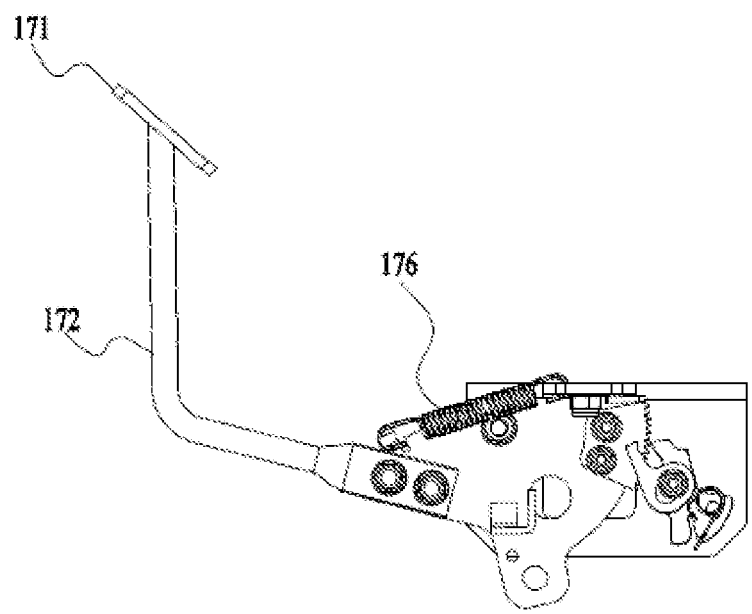
FIG. 8 is a plan view of the parking system of the riding mower of FIG. 7 when the riding mower is not in the parking state.

The user can control the force necessary for braking according to the current slope grade or speed so that the rotation angle needed to pedal by can be determined. That is, when the slope grade or the speed is low, the user can implement braking or parking by pedaling slightly. At this time, the pedal assembly rotates by a small angle, or the ratchet 175 rides over fewer teeth of the pawl 178a. When the slope grade or the speed is high, the user pedals the pedal 171 with a great force to implement braking and parking. At this time, the pedal assembly rotates through a great angle, and the ratchet 175 rides through more teeth of the pawl 178a. When the user pedals the pedal 171 to implement braking and parking according to situations, the tooth of the ratchet 175 engages with the pawl 178a. When the user disengages from the pedal 171, the pedal assembly tends to reset under the influence of the first elastic member 176, however, the ratchet 175 is restricted from rotating due to the obstruction of the pawl 178a. Moreover, since the pedal assembly tends to reset under the influence of the first elastic member 176, after the tooth of the ratchet 175 engages with the pawl 178a, the lower surface of the tooth of the ratchet 175 transmits a downward force to the upper surface of the pawl 178a in the direction from the upper side to the lower side so that the second rotator 178 is pressed to move downwards. The elastic force of the first elastic member 176 is greater than the elastic force of the second elastic member 177 so that the integrated body formed by the second rotator 178 and the third rotator 179 are pressed to move downwards. As shown in FIG. 7, at this time, the third center axis 104 of the second rotator 178 moves to and coincides with the connection pin 178c, and the integrated body formed by the second rotator 178 and the third rotator 179 can rotate about the third center axis 104. It is to be noted that when the integrated body formed by the second rotator 178 and the third rotator 179 moves downwards, the ratchet 175 keeps engaging with the pawl 178a, and the ratchet 175 and the pawl 178a move synchronously.

When the integrated body formed by the second rotator 178 and the third rotator 179 moves downwards, the accommodation recess 178d of the second elastic member 177 exerts a downward thrust on the snap ring 177a of the second elastic member 177. During this period, the second elastic member 177 is pushed to the second position. At this time, the second elastic member 177 is affected by the downward thrust. According to the lever principle, at this time, the pawl 178a tends to move upwards. At this time, the ratchet 175 engaging with the pawl 178a keeps pressing, through the lower surface of the tooth of the ratchet 175, the pawl 178a. When the user pedals the pedal 171 again, the ratchet 175 continues rotating in the first direction, and the lower surface of the tooth of the ratchet 175 currently engaging with the pawl 178a starts to escape from the upper surface of the pawl 178a. Moreover, since the pawl 178a tends to move upwards under the influence of the second elastic member 177 at this time, the pawl 178a disengages from the ratchet 175 under the influence of the second elastic member 177. Moreover, since the fourth stopper 178f formed on the second rotator 178 is limited by the second stopper 194 of the cover plate 19, during the process when the pawl 178a disengages from the ratchet 175 by rotating about the third center axis 104 in the second direction, the pawl 178a cannot be away from the ratchet 175. At this time, the ratchet 175 is no longer limited by the pawl 178a and resets under the influence of the first elastic member 176. During the process when the first elastic member 176 rotates about the first center axis 102 in the second direction to reset, the first protrusion 173c connected to the first elastic member 176 pushes the third rotator 179 to move in the second direction, and the integrated body formed by the second rotator 178 and the third rotator 179 rotates in the second direction and moves from the position of the third center axis 104 to the position of the second center axis 103. At this time, the second center axis 103 coincides with the connection pin 178c, the second elastic member 177 is pushed to the original position, and the whole system resets.

What is claimed is:
1. A riding mower, comprising:
a seat;
a main rack configured to bear the seat;

a mowing element;
a walking assembly;
an operation assembly configured to be operated by the user so that the riding mower is controlled to walk and output power;
a parking system configured to switch the riding mower between a parking state and a non-parking state;
a linkage mechanism connected to the parking system; and
a gearbox connected to the linkage mechanism;
wherein the parking system is configured to control, through the linkage mechanism, the gearbox to implement braking whereby, when the parking system is locked, the riding mower is in the parking state and, when the parking system is not locked, the riding mower is in the non-parking state.

2. A riding mower, comprising:
a seat;
a main rack configured to bear the seat;
a mowing element;
a walking assembly;
an operation assembly configured to be operated by the user so that the riding mower is controlled to walk and output power;
a parking system configured to switch the riding mower between a parking state and a non-parking state;
a linkage mechanism connected to the parking system; and
a gearbox connected to the linkage mechanism,
wherein the parking system is configured to control, through the linkage mechanism, the gearbox to implement braking whereby, when the parking system is locked, the riding mower is in the parking state and, when the parking system is not locked, the riding mower is in the non-parking state, and
wherein the parking system comprises a pedal assembly configured to be operated by the user so that the riding mower is switched between the parking state and the non-parking state, a base plate configured for mounting the pedal assembly, a cover plate configured to cooperate with the base plate so that the cover plate and the base plate are connected to the pedal assembly, a ratchet connected to the pedal assembly, and a first elastic member connected between the pedal assembly and the base plate.

3. The riding mower of claim 2, wherein the pedal assembly comprises a pedal, a first rotator connected to the pedal, and a pedal arm, the first rotator and the pedal are capable of rotating about a center axis synchronously, and one end of the pedal arm is connected to the pedal and the other end of the pedal arm is connected to the first rotator.

4. The riding mower of claim 3, wherein the first rotator is reset in a second direction under influence of the first elastic member when the pedal is not being depressed by a user.

5. The riding mower of claim 2, wherein the parking system further comprises a second rotator connected to the base plate, a second elastic member connected between the base plate and the cover plate and formed with a snap ring, and the snap ring abuts against the second rotator.

6. The riding mower of claim 5, wherein the second rotator is formed with an accommodation recess and the snap ring of the second elastic member is mounted in the accommodation recess and capable of switching between a first position and a second position.

7. The riding mower of claim 5, wherein an elastic force of the first elastic member is greater than an elastic force of the second elastic member.

8. The riding mower of claim 5, wherein the second rotator is formed with or connected to a pawl and the pawl is capable of limiting a rotation direction of the ratchet.

9. The riding mower of claim 5, wherein the cover plate is formed with a first stopper abutting against the second rotator and a second stopper configured to limit a rotation angle of the second rotator.

10. The riding mower of claim 5, wherein the parking system further comprises a third rotator, the third rotator is securely connected to or integrally formed with the second rotator, and the third rotator cooperates with a first protrusion of the base plate to switch the second elastic member from the second position to the first position.

* * * * *

UNITED STATES PATENT AND TRADEMARK OFFICE
CERTIFICATE OF CORRECTION

PATENT NO. : 11,944,039 B2  
APPLICATION NO. : 17/114834  
DATED : April 2, 2024  
INVENTOR(S) : Rong Wu, Toshinari Yamaoka and Dingming Meng Page 1 of 1

It is certified that error appears in the above-identified patent and that said Letters Patent is hereby corrected as shown below:

On the Title Page

Item [30], insert:  
--June 11, 2018 (CN) ............... 201810595487.0--

Signed and Sealed this  
Fourth Day of June, 2024

Katherine Kelly Vidal  
*Director of the United States Patent and Trademark Office*